(12) United States Patent
Hernandez et al.

(10) Patent No.: US 8,096,134 B2
(45) Date of Patent: Jan. 17, 2012

(54) COMBUSTION CHAMBER COMPRISING CHAMBER END WALL HEAT SHIELDING DEFLECTORS AND GAS TURBINE ENGINE EQUIPPED THEREWITH

(75) Inventors: Didier Hippolyte Hernandez, Quiers (FR); Thomas Olivier Marie Noel, Vincennes (FR)

(73) Assignee: SNECMA, Paris (FR)

( * ) Notice: Subject to any disclaimer, the term of this patent is extended or adjusted under 35 U.S.C. 154(b) by 1121 days.

(21) Appl. No.: 12/167,542

(22) Filed: Jul. 3, 2008

(65) Prior Publication Data

US 2009/0013694 A1  Jan. 15, 2009

(30) Foreign Application Priority Data

Jul. 4, 2007 (FR) .................................... 07 04828

(51) Int. Cl.
*F02C 1/00* (2006.01)
*F02G 3/00* (2006.01)
(52) U.S. Cl. ................. 60/756; 60/752; 60/796
(58) Field of Classification Search ............ 60/752–760, 60/804, 796, 780
See application file for complete search history.

(56) References Cited

U.S. PATENT DOCUMENTS

| | | | |
|---|---|---|---|
| 4,380,896 A | 4/1983 | Wiebe | |
| 4,843,825 A | 7/1989 | Clark | |
| 4,934,145 A * | 6/1990 | Zeisser | 60/756 |
| 5,012,645 A * | 5/1991 | Reynolds | 60/754 |
| 5,253,471 A * | 10/1993 | Richardson | 60/804 |
| 5,396,759 A * | 3/1995 | Richardson | 60/804 |
| 5,479,774 A * | 1/1996 | Burnell et al. | 60/804 |
| 5,509,270 A * | 4/1996 | Pearce et al. | 60/740 |
| 5,894,732 A * | 4/1999 | Kwan | 60/756 |
| 5,941,076 A * | 8/1999 | Sandelis | 60/752 |
| 5,956,955 A * | 9/1999 | Schmid | 60/748 |
| 5,974,805 A * | 11/1999 | Allen | 60/740 |
| 6,164,074 A | 12/2000 | Madden et al. | |
| 6,497,105 B1 * | 12/2002 | Stastny | 60/796 |
| 6,606,861 B2 * | 8/2003 | Snyder | 60/752 |
| 6,952,927 B2 * | 10/2005 | Howell et al. | 60/798 |
| 7,363,763 B2 * | 4/2008 | Coughlan et al. | 60/752 |
| 7,478,534 B2 * | 1/2009 | Guezengar et al. | 60/796 |
| 7,770,398 B2 * | 8/2010 | De Sousa et al. | 60/752 |
| 7,775,051 B2 * | 8/2010 | Hernandez et al. | 60/796 |
| 7,861,531 B2 * | 1/2011 | Bunel et al. | 60/752 |
| 7,954,327 B2 * | 6/2011 | Pieussergues et al. | 60/756 |
| 2008/0010997 A1 * | 1/2008 | Bessagnet et al. | 60/805 |

FOREIGN PATENT DOCUMENTS

EP  1 118 806 A1  7/2001
FR  2 637 675  4/1990

* cited by examiner

*Primary Examiner* — William H Rodriguez
(74) *Attorney, Agent, or Firm* — Oblon, Spivak, McClelland, Maier & Neustadt, L.L.P.

(57) ABSTRACT

An annular combustion chamber for a gas turbine engine is disclosed. The combustion chamber includes an external wall, an internal wall, a chamber end wall connecting these two walls and provided with openings for the fuel injection systems, and heat shielding deflectors fixed to the chamber end wall. The deflectors include a flat wall portion with an opening centered on said openings for the fuel injection systems, two longitudinal edges, and two transverse edges. Along one of the longitudinal edges, the deflector includes a tongue forming a joint cover, creating a housing along the edge for the edge of the adjacent deflector so as to seal the join between the two adjacent edges of the two deflectors. The tongue is spaced away from the chamber end wall so as to create a space supplied with cooling air via orifices in the chamber end wall.

8 Claims, 3 Drawing Sheets

COMBUSTION CHAMBER COMPRISING CHAMBER END WALL HEAT SHIELDING DEFLECTORS AND GAS TURBINE ENGINE EQUIPPED THEREWITH

BACKGROUND OF THE INVENTION

1. Field of the Invention

The present invention relates to the technical field of combustion chambers for gas turbine engines. It is aimed in particular at the chamber end wall. Finally, it relates to a gas turbine engine such as a turbojet engine equipped with such a combustion chamber.

2. Description of the Related Art

In all that follows, the terms "axial", "radial", "transverse" correspond respectively to an axial direction, a radial direction and a transverse plane of the engine, and the terms "upstream" and "downstream" correspond respectively to the direction in which the gases flow through the engine.

A conventional divergent combustion chamber is illustrated in FIG. 1 which is an axial section showing half of the combustion chamber, the other half thereof being its symmetric counterpart with respect to the axis of the engine (not depicted). The combustion chamber 110 is housed downstream of a diffusion chamber 130 which is an annular space defined between an external casing 132 and an internal casing 134, into which a compressed oxidizing agent, ambient air, originating upstream from a compressor (not depicted) is introduced via an annular diffusion duct 136.

This divergent combustion chamber 110 comprises two concentric walls: an external wall 112 and an internal wall 114, which are coaxial and substantially conical. The walls widen from the upstream to downstream direction. The external 112 and internal 114 walls of the combustion chamber 110 are joined together, toward the upstream side of the combustion chamber, by a chamber end wall 116.

The chamber end wall 116 is a frustoconical annular component which extends between two substantially transverse planes widening from the downstream to upstream direction. The chamber end wall 116 is connected to each of the two, external 112 and internal 114, walls of the combustion chamber 110. The chamber end wall 116 has a small cone angle. It is provided with injection systems 118 through which the injectors 120, which introduce fuel into the upstream end of the combustion chamber 110 where the combustion reactions take place, pass.

The effect of these combustion reactions is to radiate heat from the downstream to upstream direction toward the chamber end wall 116. Thus, during operation, the chamber end wall is subjected to high temperatures. To protect it, segmented heat shields, also known as deflectors 122, are inserted between the site of combustion and the chamber end walls. These deflectors 122, one of which is depicted in FIG. 2, are substantially flat plates welded to the chamber end wall 116 with a central opening 122a for the passage of the injector. They comprise two lateral baffles 122b, 122c along the radial edges facing toward the chamber end wall and two tongues for guiding air along the transverse edges facing toward the site of combustion and creating a space with respect to the respective internal and external walls 114 and 112 of the chamber. The deflectors are cooled by jets of cooling air entering the combustion chamber 110 through cooling orifices 124 pierced in the chamber end wall 116 impinging on them. The air of which these jets are formed, flowing from the upstream direction downstream, is guided by streamlining of the chamber 126, passing through the chamber end wall 116 through the cooling orifices, and impinges on the upstream face of the deflectors 122. The air is then guided radially toward the inside and the outside of the site of combustion to begin to form the film that cools the walls 114 and 112 respectively.

This guidance along the deflectors is performed by the radially directed lateral baffles. These baffles also perform a sealing function. Being in contact with or creating a minimal gap with respect to the chamber end wall, they prevent the air from infiltrating between two adjacent deflectors, from entering the site of combustion and from disrupting combustion. Such disturbances would have an impact on pollution and are therefore to be avoided. What would happen in fact would be that the performance in terms of the emissions of CO and CHx pollutants would be liable to be degraded through the unwanted ingress of this cold air, particularly at engine idling speeds at which the clearance gap is larger.

Current evolutions in the means of supplying the chamber with air and with fuel have led to the production of injection systems which are increasingly difficult to incorporate into the chamber end wall. For example, multipoint injection systems are of increasing diameter because a substantial part of the air admitted to the chamber passes through them; they therefore occupy an increasing amount of space on the periphery of the chamber end wall, leaving an ever smaller gap between two adjacent systems.

A similar situation is encountered when the number of injection systems needs to be increased for the same chamber with a view to reducing dead regions between two adjacent injectors or alternatively when the dimensions of the chamber end wall are reduced for the same number of injection systems.

It then follows that, in such instances, the deflector centering openings are close together. There is therefore very little space to form lateral baffles on the deflectors.

FIGS. 3 and 4 show two solutions that could be imagined by applying the prior art to a situation such as this. Thus, in FIG. 3, the deflector 222 has a baffle 222b, 222c on each side of the lateral edges which occupies the entire region B, C between the edge of the deflector and the flange 222a' that forms the edge of the opening 222a. This solution would maintain sealing but, because of this additional thickness, the deflector would not be able to be cooled in this region.

In FIG. 4, the solution is to interrupt the baffle 322b, 322c in the critical region between the lateral edges of the deflector 322 and the flange 322a' on the edge of the opening 322a. The space created allows the deflector to be cooled by impingement of air jets, but at the expense of sealing.

BRIEF SUMMARY OF THE INVENTION

It is an objective of the invention to remedy this problem.

According to the invention, the annular combustion chamber for a gas turbine engine comprising an external wall, an internal wall, a wall connecting these two walls and constituting a chamber end wall, the chamber end wall being provided with openings for the fuel injection systems, heat shielding deflectors being fixed to the wall, the deflectors comprising a flat wall portion with an opening centered on said openings for the fuel injection systems, two longitudinal edges and two transverse edges, is one wherein, at least along one of the longitudinal edges, a deflector comprises a tongue forming a joint cover, creating a housing along said edge for the edge of the adjacent deflector so as to seal the join between the two edges, said tongue being spaced away from the chamber end wall so as to create a space supplied with cooling air via orifices in the chamber end wall.

By virtue of the solution of the invention, the critical region lying between two adjacent openings is both sealed by the joint cover and cooled because the joint cover makes it possible to create a space supplied with cooling air.

More specifically, the chamber has the following features:
the housing is formed by a discontinuity of the wall;
the deflectors comprise a shoulder via which they rest against the edge of the openings for the injection systems;
the shoulder creates a gap between the chamber end wall and the joint cover in the region lying between two adjacent openings for the systems for injecting fuel;
the transverse edges of the deflectors comprise a curved wall portion, the housings also being created along the longitudinal edges of said curved portion;
the deflectors comprise a joint cover along a longitudinal edge and an edge without a joint cover along the other longitudinal edge, the two edges complementing one another so as to fit onto an edge of another like deflector positioned edge to edge with it;
a proportion of the deflectors comprises a joint cover along both longitudinal edges;
a proportion of the deflectors comprises two longitudinal edges that complement the joint covers of the above deflectors.

BRIEF DESCRIPTION OF THE SEVERAL VIEWS OF THE DRAWINGS

Other features and advantages will become apparent from the following description of some embodiments of the invention with reference to the attached drawings in which.

DETAILED DESCRIPTION OF THE INVENTION

Figure 5:
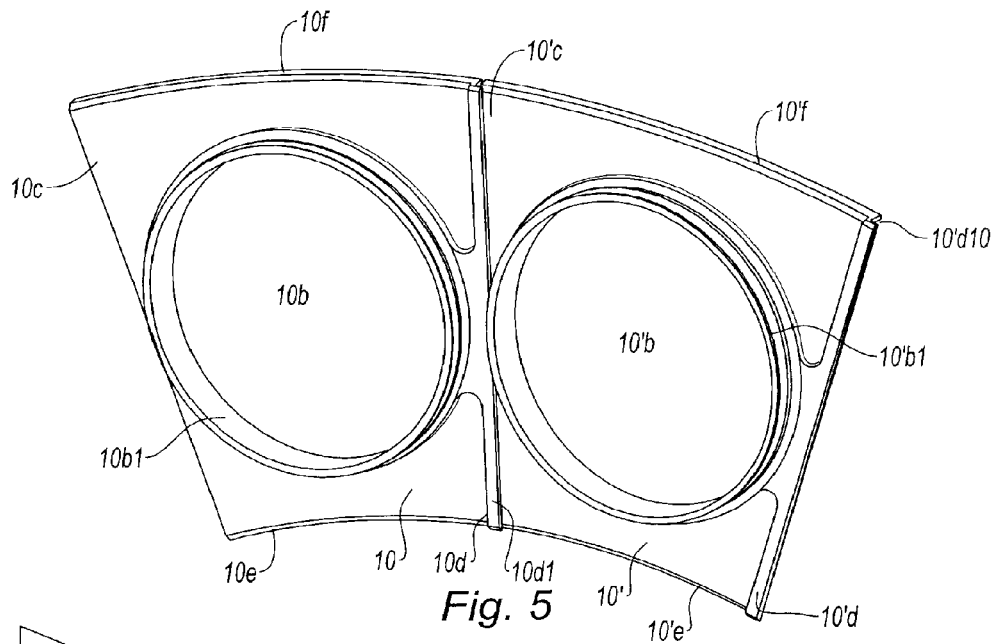
FIG. 5 shows, viewed in perspective, two deflectors for heat shielding the chamber end wall of the invention.
Figure 6:
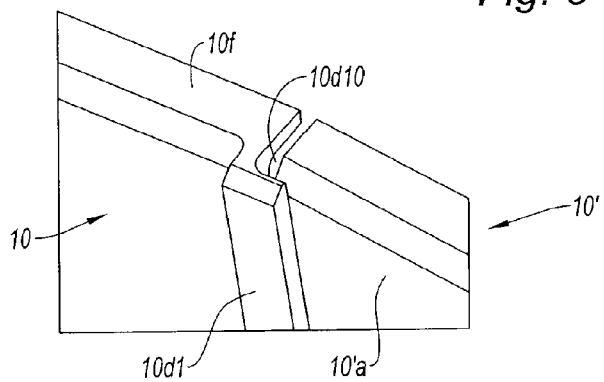
FIG. 6 shows details of the joint cover on the deflectors of FIG. 5.
Figure 7:
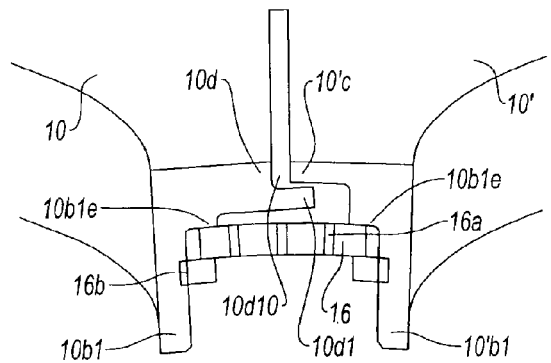
FIG. 7 shows details of the region between two openings in the combustion chamber.

Reference is now made to FIGS. 5 to 7 which depict a first embodiment of the sealing between two deflectors 10 and 10' made of refractory material positioned side by side in the chamber end wall. The deflector 10 comprises a flat part 10a with a central opening 10b, corresponding to the housing of an injector, not depicted. In FIG. 5, the opening is bordered by a flange 10b1 for fastening into the chamber end wall. The deflector comprises two longitudinal edges facing in a radial direction with respect to the axis of the engine. The longitudinal edge 10c and the edge 10d are straight. The deflector 10 also comprises two transverse edges 10e and 10f which are both rounded in order to follow the curvature of the combustion chamber and curved toward the inside of the combustion chamber in order to guide the air. The edge 10c, on the left in FIG. 5, is straight and follows the radial profile of the deflector. The edge 10d on the other side comprises a rear discontinuity with respect to the face visible in FIG. 5, formed of a tongue 10d1 which extends the rear face of the wall of the deflector. This discontinuity forms a longitudinal housing 10d10 for the edge 10'c of the adjacent deflector 10'. This deflector 10' is identical to the deflector 10. It comprises a flat part 10'a, two longitudinal edges 10'c and 10'd and two rounded and curved transverse edges 10'e and 10'f. The edge 10'd comprises a longitudinal tongue 10'd1 creating a housing 10'd10.

In the example of FIGS. 5 to 7, the deflectors are all identical and mounted on the periphery of the chamber end wall 16, not depicted in FIGS. 5 and 6, fixed by flanges 10b1 and 10'b1 of the openings 10b, 10'b for the injection systems. There is one injection system per deflector. The joint cover formed by the tongue 10d1 of each of the deflectors covers the edge 10'c of the adjacent deflector 10' over enough width to accommodate variations in expansion of the combustion chamber. Each housing 10d10, 10'd10 is designed to retain the edge 10c, 10'c of the adjacent deflector in such a way that leaks between two adjacent deflectors are reduced if not completely eliminated irrespective of engine speed.

The mutual arrangement of the deflectors 10 and 10' on the one hand and of the chamber end wall 16 on the other can be seen in cross section in FIG. 7. It should be noted that the distance between two adjacent openings in the chamber end wall is very small. The deflectors rest against the edge of the openings via a shoulder 10b1e and 10'b1e respectively. The wall of the deflector 10 is extended along the edge 10d by the tongue 10d1 which covers the edge 10'c of the adjacent deflector 10'. Thanks to the shoulder 10b1e, 10'b1e, a space is created between the chamber end wall 16 and the rear faces of the deflector. Air, in the form of a jet, passes through the orifices 16a made in the chamber end wall between the two openings. It may be noted that the deflectors are immobilized with respect to the chamber end wall by clips 16b which, with the shoulders, form a clamp in respect of the chamber end wall.

Thus, the solution of the invention makes it possible both to provide sealing between the deflectors and to provide cooling by impingement of air jets in the narrow critical region that lies between the openings through which the injection systems pass.

Figure 8:
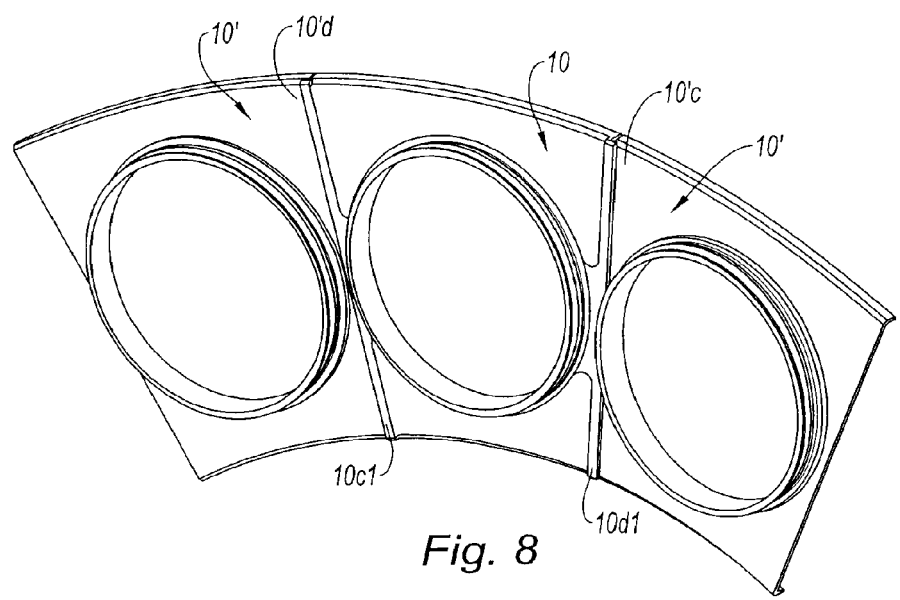
FIG. 8 shows an alternative form of embodiment of sealing between two adjacent deflectors.
Figure 1:
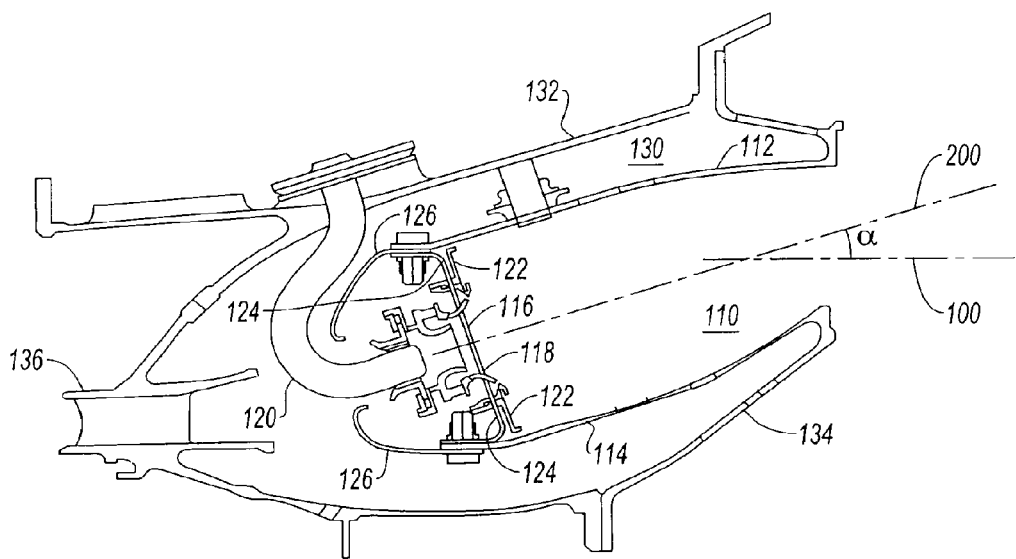
FIG. 1 depicts, in axial section, half of a divergent combustion chamber of a type known per se.
Figure 2:
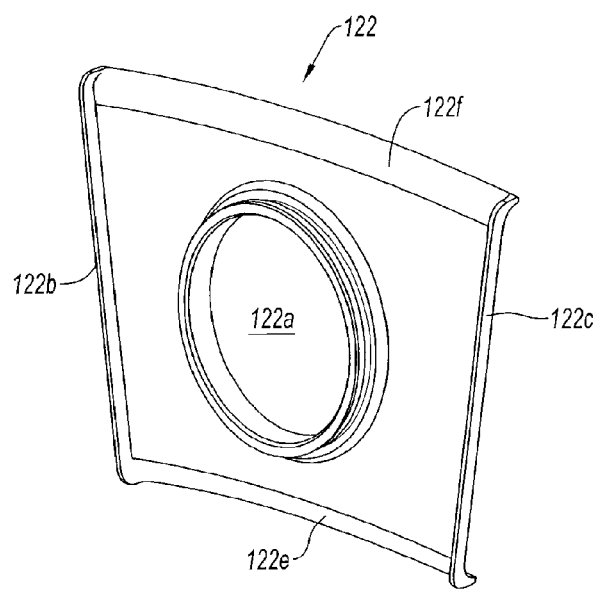
FIG. 2 shows a deflector of the prior art used for heat shielding the combustion chamber end wall.
Figure 3:
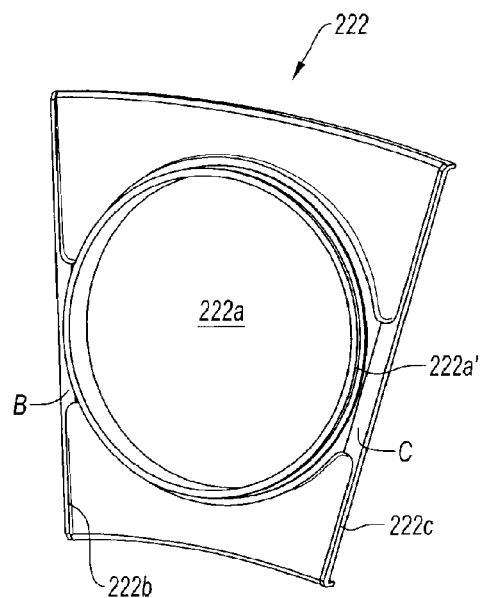
FIG. 3 shows a configuration of a deflector according to the teachings of the prior art.
Figure 4:
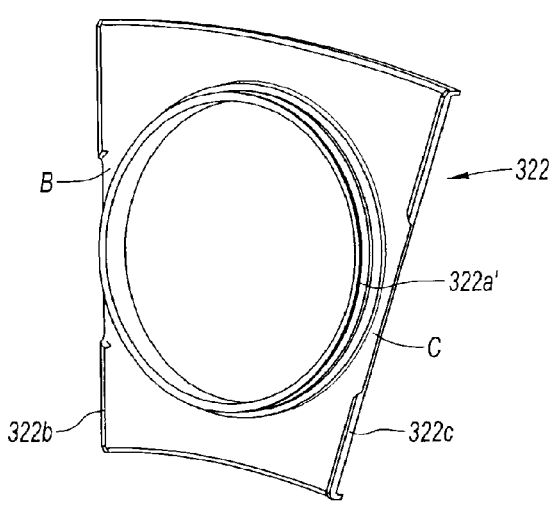
FIG. 4 shows another configuration according to the teachings of the prior art.

In the embodiment of FIGS. 5 to 7, the deflectors are identical, but the solution also covers instances where a first deflector 10 comprises a joint cover 10c1 and 10d1 along the two longitudinal edges collaborating with the plain edges 10'c and 10'd of a second deflector 10' that has no joint cover. The effectiveness is the same. This is demonstrated in FIG. 8. However, fitting differs. It is simpler, but does require two different designs of component to be manufactured.

The invention claimed is:

1. An annular combustion chamber for a gas turbine engine comprising:
an external wall;
an internal wall;
a chamber end wall connecting the external and internal walls, the chamber end wall being provided with openings for fuel injection systems; and
heat shielding deflectors being fixed to the chamber end wall, each of the deflectors comprising a flat wall portion with an opening centered on said openings for the fuel injection systems, first and second longitudinal edges, and first and second transverse edges, the opening is bordered by a flange extending in an upstream direction,
wherein the deflector includes a tongue along the first longitudinal edge from the first transverse edge to the second transverse edge, the tongue extending in a circumferential direction and forming a joint cover so as to create a housing along said first longitudinal edge for a second longitudinal edge of an adjacent deflector so as to seal the joint cover between the two adjacent longitudinal edges of the two deflectors, wherein the flange includes a shoulder with an upstream face which abuts against a downstream face of the chamber end wall and a free end of the flange extending in the upstream direction which passes through the openings in the chamber end wall such that said tongue is spaced away from the chamber end wall so as to create a space supplied with cooling air via orifices in the chamber end wall.

2. The combustion chamber as claimed in claim 1, wherein the housing is formed by a discontinuity of the flat wall portion.

3. The combustion chamber as claimed in claim 1, wherein the transverse edges of the deflectors comprise a curved wall portion, the housing also being created along the longitudinal edges of said curved portion.

4. The combustion chamber as claimed in claim 1, wherein the deflectors comprise the joint cover along the first longitudinal edge and an edge without a joint cover along the second longitudinal edge, the two edges complementing one another so as to fit onto an edge of another like deflector positioned edge to edge with it.

5. The chamber as claimed in claim 1, wherein a proportion of the deflectors comprises the joint cover along both longitudinal edges.

6. A combustion chamber of which a proportion of the deflectors comprises two longitudinal edges that complement the joint covers of the deflectors as claimed in claim 1.

7. A gas turbine engine comprising a combustion chamber as claimed in claim 1.

8. The chamber as claimed in claim 1, wherein a clip is provided on an upstream face of the chamber end wall, the clip cooperating with the shoulder to form a clamp.

* * * * *